(12) United States Patent
Kinashi et al.

(10) Patent No.: US 9,542,569 B2
(45) Date of Patent: Jan. 10, 2017

(54) INFORMATION PROCESSING SYSTEM, INFORMATION PROCESSING APPARATUS, STORAGE MEDIUM HAVING STORED THEREIN INFORMATION PROCESSING PROGRAM, AND METHOD OF STORING SAVED DATA

(71) Applicant: NINTENDO CO., LTD., Kyoto (JP)

(72) Inventors: Akira Kinashi, Kyoto (JP); Hironori Ichibayashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 312 days.

(21) Appl. No.: 14/487,572

(22) Filed: Sep. 16, 2014

(65) Prior Publication Data

US 2015/0100710 A1   Apr. 9, 2015

(30) Foreign Application Priority Data

Oct. 8, 2013   (JP) ................. 2013-210762

(51) Int. Cl.
| | |
|---|---|
| *G06F 3/00* | (2006.01) |
| *G06F 7/04* | (2006.01) |
| *G06F 21/62* | (2013.01) |
| *A63F 13/49* | (2014.01) |
| *A63F 13/75* | (2014.01) |

(52) U.S. Cl.
CPC ........... *G06F 21/6218* (2013.01); *A63F 13/49* (2014.09); *A63F 13/75* (2014.09); *G06F 2221/2109* (2013.01)

(58) Field of Classification Search
None
See application file for complete search history.

(56) References Cited

U.S. PATENT DOCUMENTS

2009/0328218 A1* 12/2009 Tsurukawa ............. G06F 21/64
726/23

FOREIGN PATENT DOCUMENTS

JP   2009-106776   5/2009

* cited by examiner

*Primary Examiner* — Idriss N Alrobaye
*Assistant Examiner* — Richard B Franklin
(74) *Attorney, Agent, or Firm* — Nixon & Vanderhye P.C.

(57) ABSTRACT

An example of an information processing system includes first storage means for storing saved data of an application and a second storage means. The information processing system, every time saved data is updated, stores, in the first storage means and the second storage means, identification information indicating the updated saved data. Further, the information processing system, every time saved data is updated, stores, in at least one of the first storage means and the second storage means, the identification information corresponding to the saved data before being updated. Use of the saved data stored in the first storage means is allowed at least under the condition that the identification information indicating the same saved data is stored in the first storage means and the second storage means.

12 Claims, 8 Drawing Sheets

INFORMATION PROCESSING SYSTEM, INFORMATION PROCESSING APPARATUS, STORAGE MEDIUM HAVING STORED THEREIN INFORMATION PROCESSING PROGRAM, AND METHOD OF STORING SAVED DATA

CROSS REFERENCE TO RELATED APPLICATION

The disclosure of Japanese Patent Application No. 2013-210762, filed on Oct. 8, 2013, is incorporated herein by reference.

FIELD

The technique relates to an information processing system and an information processing apparatus for storing saved data of an application in a storage medium, a storage medium having stored therein an information processing program for storing saved data of an application in a storage medium, and a method of storing saved data.

BACKGROUND AND SUMMARY

Conventionally, there is a technique for storing saved data of an application (for example, a game program or the like) in a storage medium. Saved data is stored in a predetermined storage medium that can be accessed by an information processing apparatus. Then, the saved data is read by the information processing apparatus at appropriate timing and then used in an application that is being executed by the information processing apparatus.

If the saved data stored in the storage medium is copied and the copied saved data can be used, dishonesty (for example, dishonesty in a game) may be committed using the copied saved data. Thus, it is preferable to limit or prohibit the use of copied saved data.

Therefore, the present application discloses an information processing system and an information processing apparatus that are capable of reducing the possibility of the use of saved data copied dishonestly, a storage medium having stored therein an information processing program capable of reducing the possibility of the use of saved data copied dishonestly, and a method of storing saved data.

(1)

An example of an information processing system according to the present specification includes first storage means, second storage means, first storage control means, second storage control means, and use control means. The first storage means is used to store saved data of an application. The second storage control means may be, for example, a storage device (storage medium) different from the first storage means or may be the same storage device (storage medium) as the first storage means. The first storage control means, every time saved data is updated, stores, in the first storage means and the second storage means, identification information indicating the updated saved data. The second storage control means, every time saved data is updated, stores, in at least one of the first storage means and the second storage means, the identification information correspond to the saved data before being updated. The use control means allows use of saved data stored in the first storage means, at least under the condition that the identification information indicating the same saved data is stored in the first storage means and the second storage means.

According to the above configuration (1), it is determined, based on identification information, whether or not it is possible to use saved data. This makes it possible to reduce the possibility of the abuse of saved data. Further, the identification information corresponding to the saved data before being updated is stored, and a determination is made based also on the identification information. This makes it possible to use the saved data even if the process of updating the saved data (a saving process) has not normally been performed.

(2)

The information processing system may further include processing execution means and update means. The processing execution means executes predetermined information processing during execution of the application. The update means, if the predetermined information processing is executed, updates the saved data before the execution of the information processing, and updates the saved data after the execution of the predetermined information processing.

According to the above configuration (2), two saving processes in total are performed before and after predetermined information processing. Based on this, even if the process of updating the saved data (the saving process) has not normally been performed, it is impossible to use the saved data before the two saving processes. This makes it possible to reduce the possibility the abuse of saved data from the past.

(3)

If a user has given an instruction to execute the predetermined information processing, the processing execution means may execute the predetermined information processing under the condition that update of the saved data and the identification information before the execution of the predetermined information processing has been completed.

According to the above configuration (3), the predetermined information processing is not performed in the state where the saved data before the saving process performed before the predetermined information processing remains in first storage means. This makes it possible to further reduce the possibility of the abuse of saved data from the past.

(4)

The saved data may include information indicating an object that appears in the application. The predetermined information processing may be a process of performing communication between the information processing system and another information processing system, and may be a process of deleting the object in the application executed in the information processing system, and adding the object to the application executed in the other information processing system.

According to the above configuration (4), as the predetermined information processing, a communication process for delivering an object that appears in an application executed in an information processing system to the application executed in another information processing system is performed. When such a communication process is performed, dishonesty in a game, such as copying the object, may be committed. According to the above configuration (4), however, it is possible to reduce the possibility of the commission of such dishonesty.

(5)

The information processing system may further include identification information generation means for, if the saved data is updated, generating the identification information indicating the updated saved data based on a random number.

According to the above configuration (5), the use of the identification information generated based on a random number makes it difficult (or impossible) to estimate the content (value) of the identification information. Thus, it is difficult to falsify the identification information so that the content stored in first storage means in the past can be used again. This makes it possible to prevent the abuse of saved data with more certainty.

(6)

The information processing system may further include identification information generation means for, if the saved data is updated, generating the identification information indicating the updated saved data based on the updated saved data.

According to the above configuration (6), it is possible to easily generate the identification information from the saved data.

(7)

The second storage control means may store, in either one of the first storage device and the second storage device, the identification information corresponding to the saved data before being updated. The first storage control means, if the saved data is updated, may store the identification information corresponding to the updated saved data, between the first storage means and the second storage means, first in storage means for storing the identification information corresponding to the saved data before being updated and later in the other storage means.

According to the above configuration (7), the identification information corresponding to the saved data before being updated is stored in storage means for storing the identification information corresponding to the updated saved data first. Based on this, even if, as a result of the fact that the process of updating the saved data (the saving process) has not normally been performed, the content of the identification information is different between the first storage means and the second storage means, it is possible to the use saved data.

(8)

The information processing system may include an information processing apparatus for executing the application. The first storage means may be a storage medium attachable to and detachable from the information processing apparatus. The second storage means may be a storage medium built into the information processing apparatus.

According to the above configuration (8), the saved data is stored in first storage means that is easily replaced in an information processing apparatus. This makes it possible to improve the convenience of a user. Further, the identification information is stored in second storage means in which it is relatively difficult to copy data, and it is determined, using the identification information, whether or not it is possible to use the saved data. This makes it possible to reduce the possibility of the abuse of saved data.

The present specification discloses an information processing apparatus including functions equivalent to those of the information processing apparatus in the information processing system in the above configurations (1) to (8), and discloses an information processing program for causing a computer to execute processing in the information processing apparatus. Further, the present specification discloses a method of storing saved data, the method to be executed in the above configurations (1) to (8).

According to the information processing system, the information processing apparatus, the storage medium having stored therein the information processing program, and the method of storing saved data, it is determined, using identification information of saved data, whether or not it is possible to use the saved data. This makes it possible to reduce the possibility of the abuse of saved data.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

[1. Configuration of Information Processing System]

Figure 1:
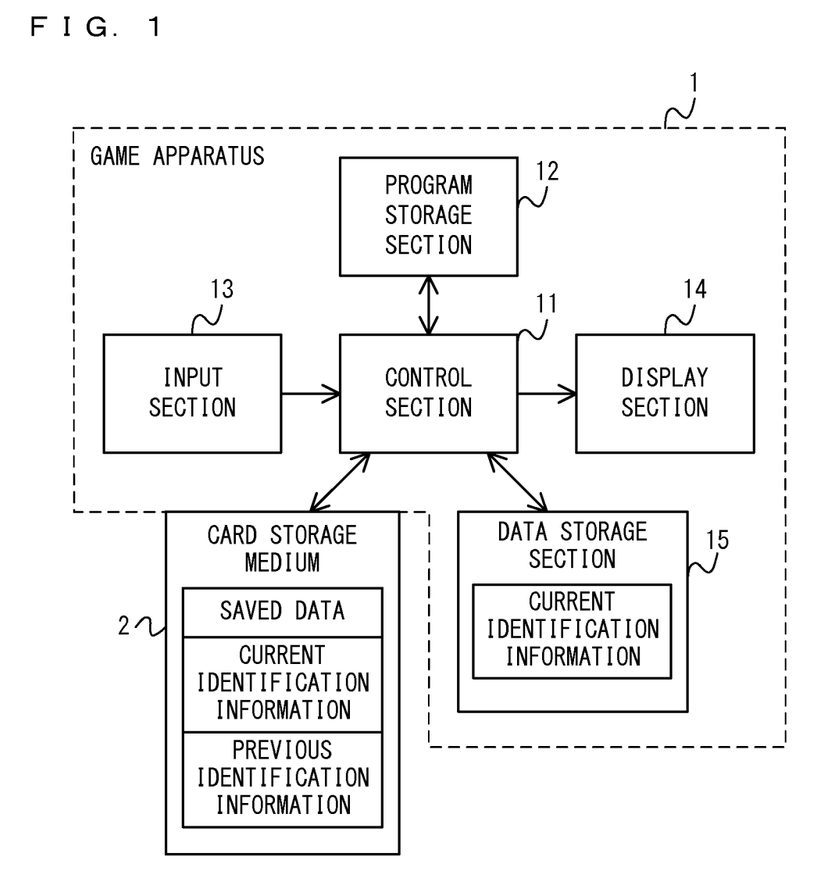
FIG. 1 is a block diagram showing an example of the configuration of an information processing system according to an exemplary embodiment.

A description is given below of an information processing system, an information processing apparatus, a storage medium having stored therein an information processing program, and a method of storing saved data, according to an exemplary embodiment. First, the configuration of the information processing system is described. FIG. 1 is a block diagram showing an example of the configuration of the information processing system according to the exemplary embodiment. As shown in FIG. 1, the information processing system includes a game apparatus 1 and a card storage medium 2. The card storage medium 2 is detachably attached to the game apparatus 1, and the game apparatus 1 can access the attached card storage medium 2.

The game apparatus 1, which is an example of the information processing apparatus, executes a game program, which is an example of the information processing program. Although the details will be described later, the game apparatus 1 stores, in the card storage medium, saved data representing the situation of a game performed by the game program (the state of the player character and the like) (see FIG. 1). It should be noted that the information processing apparatus is not limited to a game apparatus, but may be an information processing apparatus in any form, such as a personal computer, a mobile terminal, or a smartphone.

The game apparatus 1 includes a control section 11. The control section 11 performs various types of information processing (game processing described later and the like) to be performed in the information processing system. The control section 11 includes a CPU (Central Processing Unit) and a memory. The CPU executes a predetermined information processing program (the game program) using the memory, thereby performing the various types of information processing.

The game apparatus 1 includes a program storage section 12. The program storage section 12 stores the game program to be executed by the game apparatus 1. The program storage section 12 is any storage device (storage medium) that can be accessed by the control section 11. The program storage section 12 may be a storage section built into the game apparatus 1, such as a hard disk or a memory, or may be a storage medium attachable to and detachable from the game apparatus 1, such as an optical disk or a cartridge.

The game apparatus 1 includes an input section 13. The input section 13 is any input device that receives an input from a user, such as a button (a key), a touch panel, and/or a mouse. Further, the game apparatus 1 includes a display section 14. The display section 14 includes a display device that displays an image generated by information processing performed by the game apparatus 1.

The game apparatus 1 includes a data storage section 15. The data storage section 15 stores identification information for identifying saved data of the game (see FIG. 1). Although the details will be described later, in the exemplary embodiment, saved data is generated by the game apparatus 1 and stored in the card storage medium 2. Then, every time saved data is generated (that is, every time a saving process is performed), identification information is provided to the generated saved data. The data storage section 15 stores the identification information corresponding to the latest saved data generated by the game apparatus 1 (referred to as "current identification information").

It should be noted that in the exemplary embodiment, the data storage section 15 is a non-volatile storage medium built into the game apparatus 1. Further, in the exemplary embodiment, the data storage section 15 is a storage area that cannot normally be accessed by the user, and is a storage area where it is more difficult to change (falsify) data (than the card storage medium 2, which stores saved data).

The game apparatus 1 may be composed of a single information processing apparatus (for example, a handheld information processing apparatus) or may be composed of a plurality of apparatuses. For example, in another exemplary embodiment, the game apparatus 1 may include a main information processing apparatus, which includes the control section 11 and performs information processing, and a terminal apparatus, which includes the input section 13 and/or the display section 14. For example, in another embodiment, at least a part of the information processing performed by the game apparatus 1 may be distributed to and performed by a plurality of apparatuses capable of performing communication via a network (a wide area network and/or a local network).

The card storage medium 2 stores saved data of the game (the game program) performed by the game apparatus 1 (see FIG. 1). That is, if a predetermined saving process has been performed by the game apparatus 1 while the game program is being executed, saved data is generated by the game apparatus 1 and stored in the card storage medium 2 that is attached to the game apparatus 1 at that time. Further, as shown in FIG. 1, the card storage medium 2 stores the identification information corresponding to the stored saved data (the current identification information). Further, the card storage medium 2 stores the identification information corresponding to saved data stored one piece before the currently stored saved data (referred to as "previous identification information").

It should be noted that the card storage medium 2 is a card-type storage device attachable to and detachable from the game apparatus 1. In the exemplary embodiment, the card storage medium 2 is a general-purpose storage device (in other words, a storage device also attachable to an information processing apparatus of a different type from that of the game apparatus 1), but may be a storage device dedicated to the game apparatus 1. Further, the card storage medium 2 may be a storage medium for storing the game program (that is, the card storage medium 2 may include the program storage section 12). Further, the storage device for storing saved data and the like (saved data, the current identification information, and the previous identification information) is not limited to a storage device attachable to and detachable from the game apparatus 1. In another exemplary embodiment, the storage device may be a storage device built into the game apparatus 1.

[2. Overview of Processing Performed by Game Apparatus]

Figure 2:
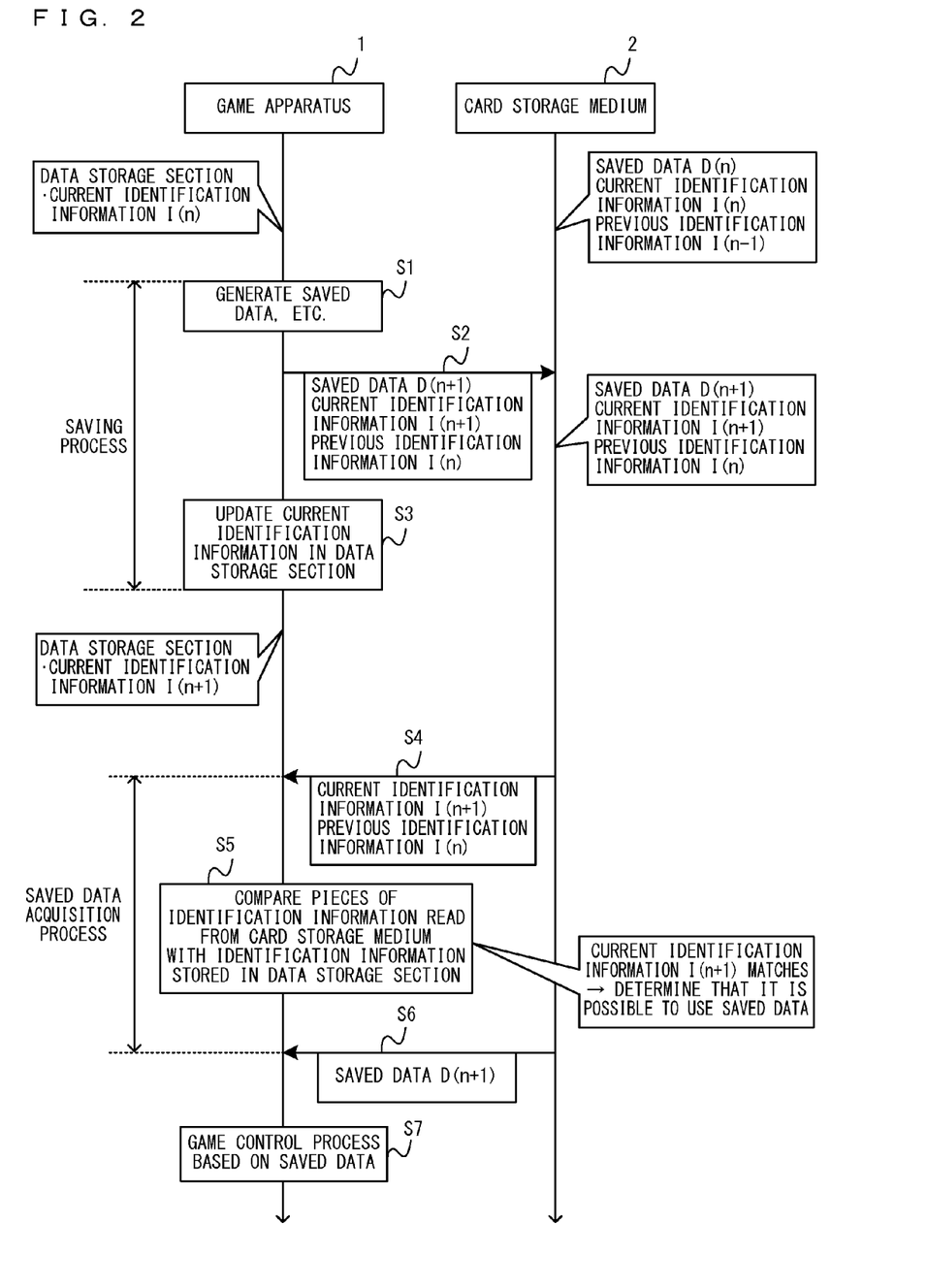
FIG. 2 is a diagram showing examples of the flows of the operations performed in a saving process and a saved data acquisition process according to the exemplary embodiment.

With reference to FIGS. 2 to 5, an overview of the processing performed in the information processing system is described below. FIG. 2 is a diagram showing examples of the flows of the operations performed in a saving process and a saved data acquisition process according to the exemplary embodiment.

(2-1: Saving Process)

First, a description is given of the saving process for storing saved data in the card storage medium 2. It should be noted that in FIG. 2, a description is given taking as an example the case where the following data (information) is stored in the card storage medium 2 before the saving process.

Saved data D(n)

Current identification information I(n) corresponding to saved data D(n)

Previous identification information I(n−1) corresponding to saved data stored before the saved data D(n).

Further, it is assumed that the data storage section 15 of the game apparatus 1 stores the current identification information I(n) before the saving process.

If the saving process has been started, first, the game apparatus 1 generates saved data and identification information (step S1). That is, saved data D(n+1), which represents the game situation at that time, is generated, and current identification information I(n+1), which corresponds to the generated saved data D(n+1), is generated. In the exemplary embodiment, (current) identification information is a random value that is random for each piece of saved data. That is, the game apparatus 1 generates a random value as described above every time the game apparatus 1 generates saved data.

Next, the game apparatus 1 stores the saved data and the like in the card storage medium 2 (step S2). That is, the saved data D(n+1), the current identification information I(n+1), and previous identification information I(n) are stored in the card storage medium 2 (see FIG. 2). Here, the game apparatus 1 stores the identification information I(n), which has been stored in the data storage section 15 as the current identification information before the saving process, in the card storage medium 2 as the previous identification information I(n). The process of step S2 results in updating the saved data, the current identification information, and the previous identification information stored in the card storage medium 2.

If the process of storing the saved data and the like in the card storage medium 2 (step S2) has finished, the game apparatus 1 updates the current identification information in the data storage section 15 (step S3). That is, the current identification information I(n+1) is stored in the data storage section 15, and the current identification information I(n), which has been stored before the saving process, is deleted.

As a result of the above saving process, the saved data and the like are stored in the card storage medium 2. Here, the above operation is an operation performed when the saving process has normally been performed (the case will be described later where the saving process is not normally performed). If the saving process has normally been performed, the card storage medium 2 stores the saved data D(n+1), the current identification information I(n+1), and the previous identification information I(n), and the data storage section 15 stores the current identification information I(n+1).

(2-2: Saved Data Acquisition Process)

Next, a description is given of the saved data acquisition process for acquiring (reading) saved data stored in the card storage medium 2. Hereinafter, a description is given taking as an example the case where the saved data acquisition process is performed after the saving process described in the above "2-1: Saving Process" (see FIG. 2).

If the saved data acquisition process has been started, first, the game apparatus 1 reads the current identification information I(n+1) and the previous identification information I(n) from the card storage medium 2 (step S4). Next, the game apparatus 1 compares the two pieces of identification information read from the card storage medium 2 with the current identification information stored in the data storage section 15 and determines whether or not it is possible to use the saved data (step S5). Specifically, the game apparatus 1 determines whether or not the current identification information stored in the data storage section 15 matches either of the two pieces of identification information read from the card storage medium 2.

If it has been determined that the current identification information stored in the data storage section 15 matches either of the pieces of identification information stored in the card storage medium 2, the game apparatus 1 determines that it is possible to use the saved data. Then, the game apparatus 1 reads the saved data D(n+1) from the card storage medium 2 as shown in FIG. 2 (step S6). At this time, based on the read saved data, a game control process for advancing the game is performed (step S7).

Although not shown in FIG. 2, if, on the other hand, it has been determined that the current identification information stored in the data storage section 15 does not match either of the pieces of identification information in the card storage medium 2, the game apparatus 1 determines that it is impossible to use the saved data. Thus, the game apparatus 1 does not read the saved data.

As described above, in the exemplary embodiment, in the saving process, identification information is stored together with saved data in the card storage medium 2, and the identification information is stored also in another storage means (the data storage section 15) (steps S2 and S3). In the saved data acquisition process, if the identification information stored in the card storage medium 2 matches the identification information stored in the data storage section 15, it is possible to use (read) the saved data. This can reduce the possibility of the abuse of previous saved data.

Here, as a possible method of abusing previous saved data, saved data stored in the card storage medium 2 may be copied in another storage device, and after the saved data stored in the card storage medium 2 has been updated, the copied saved data may be used. If saved data from the past can be used again using such a method, for example, it may be possible to commit dishonesty in the game, such as making many copies of a valuable item. In response, in the exemplary embodiment, the current identification information stored in the data storage section 15 is updated every time the saving process is performed. Thus, it is not possible to use copied previous saved data. Based on the above, according to the exemplary embodiment, it is possible to reduce the possibility of the use of saved data copied dishonestly.

Figure 3:
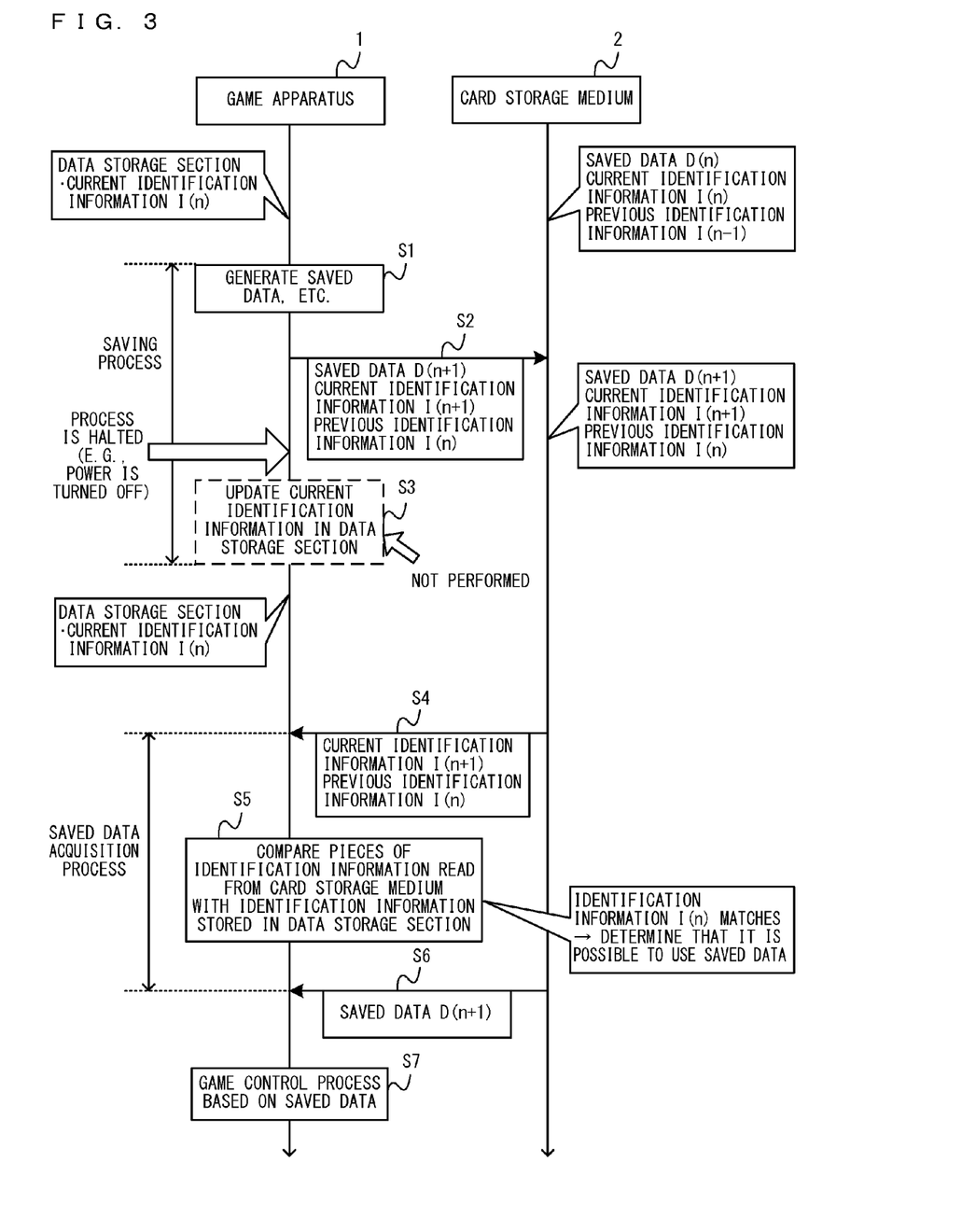
FIG. 3 is a diagram showing examples of the flows of the operations performed in the saving process and the saved data acquisition process in the case where the saving process is not normally performed.

Further, in the exemplary embodiment, the card storage medium 2 stores the previous identification information as well as the current identification information. The storage of the current identification information in the card storage medium 2 can prevent the abuse of saved data as described above. Thus, the card storage medium 2 may not store the previous identification information. The storage of the previous identification information, however, has the following advantage. With reference to FIG. 3, the effect of the storage of the previous identification information is described below.

(2-3: Operations in Case where Saving Process is not Normally Performed)

FIG. 3 is a diagram showing examples of the flows of the operations performed in the saving process and the saved data acquisition process in the case where the saving process is not normally performed. FIG. 3 shows the case where, after the process of writing data to the card storage medium 2 (step S2) has been completed in the middle of the saving process, the saving process has been halted for some reason. It should be noted that examples of the reason for halting the saving process include the fact that the user has turned off the game apparatus 1, and the fact that the power of the game apparatus 1 has run out and the operation of the game apparatus 1 has stopped.

If the saving process has been halted in the middle as described above, as shown in FIG. 3, the card storage medium 2 stores the updated contents, that is, the saved data D(n+1), the current identification information I(n+1), and the previous identification information I(n). On the other hand, the update process (step S3) is not performed in the data storage section 15. Thus, the data storage section 15 keeps storing the content before being updated, that is, the current identification information I(n). As described above, if the saving process has been halted in the middle, the content of the current identification information may be different between the card storage medium 2 and the data storage section 15. Here, if the previous identification information is not stored in the card storage medium 2, it is not possible to use the saved data D(n+1) stored in the card storage medium 2 in the above case, which is inconvenient to the user.

In response, in the exemplary embodiment, the previous identification information is stored in the card storage medium 2, thereby enabling the use of the saved data D(n+1) in the above case. That is, in the saved data acquisition process, as shown in FIG. 3, first, the current identification information I(n+1) and the previous identification information I(n) are read from the card storage medium 2 (step S4). Then, the game apparatus 1 compares the two pieces of identification information read from the card storage medium 2 with the current identification information stored in the data storage section 15 and determines whether or not the current identification information stored in the data storage section 15 matches either of the two pieces of identification information read from the card storage medium 2 (step S5). If the saving process has been halted in the middle as described above, the current identification information stored in the data storage section 15 I(n) matches the previous identification information I(n) read from the card storage medium 2. Thus, it is possible to use the saved data D(n+1) (steps S6 and S7).

As described above, in the exemplary embodiment, the information processing system includes first storage means (the card storage medium 2) for storing saved data of an application (the game program), and second storage means (the data storage section 15). Every time saved data is updated, the game apparatus 1 stores, in the card storage medium 2 and the data storage section 15, identification information (the current identification information) that allows the identification of the updated saved data (steps S2 and S3). Further, every time saved data is updated, the game apparatus 1 stores, in the card storage medium 2, the identification information (the previous identification information) corresponding to the saved data before being updated (step S2). At least under the condition that the identification information indicating the same saved data is stored in the card storage medium 2 and the data storage section 15 (step S5), the game apparatus 1 enables the use of the saved data stored in the card storage medium 2 (step S6). Based on the above, it is determined, using identification information, whether or not it is possible to use saved data. This makes it possible to reduce the possibility of the abuse of saved data. Further, the storage of the previous identification information makes it possible to, if the saving process has not been normally performed, use the saved data before the saving process.

It should be noted that, in the exemplary embodiment, the game apparatus 1 stores the previous identification information corresponding to the saved data before being updated, in either one (the card storage medium 2 in the exemplary embodiment) of the first storage means (the card storage medium 2) and the second storage means (the data storage section 15). Then, if the saved data is updated, the game apparatus 1 stores the current identification information corresponding to the updated saved data, between the first storage means and the second storage means, first in the storage means (the card storage medium 2) for storing the identification information corresponding to saved data before being updated and later in the other storage means (the data storage section 15). That is, the game apparatus 1 stores the previous identification information in the storage means (the card storage medium 2) for storing the current identification information first in the saving process. Based on this, as described above, even if the pieces of identification information do not match each other between the first storage means and the second storage means as a result of halting the saving process, it is possible to use the saved data before the saving process.

It should be noted that in another exemplary embodiment, in the saving process, the current identification information may be stored in (written to) the data storage section 15 before the card storage medium 2. In this case, the game apparatus 1 may store the previous identification information in the data storage section 15. Based also on this, it is possible to obtain an effect similar to the above. Alternatively, in another exemplary embodiment, the previous identification information may be stored in both the first storage means and the second storage means (the card storage medium 2 and the data storage section 15). Based on this, regardless of which of the first storage means and the second storage means the current identification information is written first to, it is possible to obtain an effect similar to the above.

Further, in the exemplary embodiment, the information processing system includes the first storage means (the card storage medium 2) for storing saved data of an application executed in the information processing apparatus (the game apparatus 1), and the second storage means (the data storage section 15). Here, the card storage medium 2 is a storage medium attachable to and detachable from the game apparatus 1, and the data storage section 15 is a storage medium built into the game apparatus 1. Thus, in the exemplary embodiment, saved data is stored in the card storage medium 2 that can be easily replaced in the game apparatus 1. This makes it possible to improve the convenience of the user (for example, the user can easily replace the card storage medium 2 with a storage medium having a larger capacity). Further, the card storage medium 2 has the advantage of being easily replaced; however, it is relatively easy to copy data in the card storage medium 2. In response to this, in the exemplary embodiment, identification information is stored in a storage medium in which it is difficult to copy data, and it is determined, using the identification information, whether or not it is possible to use saved data. This makes it possible to reduce the possibility of the abuse of saved data.

(2-4: Game Processing)

Next, the flow of game processing performed by the game apparatus 1 is described. In the exemplary embodiment, during the game processing, a communication process is performed between the game apparatus 1 and another game apparatus, and the saving process is performed before and after the communication process. Hereinafter, a description is given of the case where the saved data acquisition process is performed after the start of the game processing, and then, the communication process and the saving process are performed.

Figure 4:
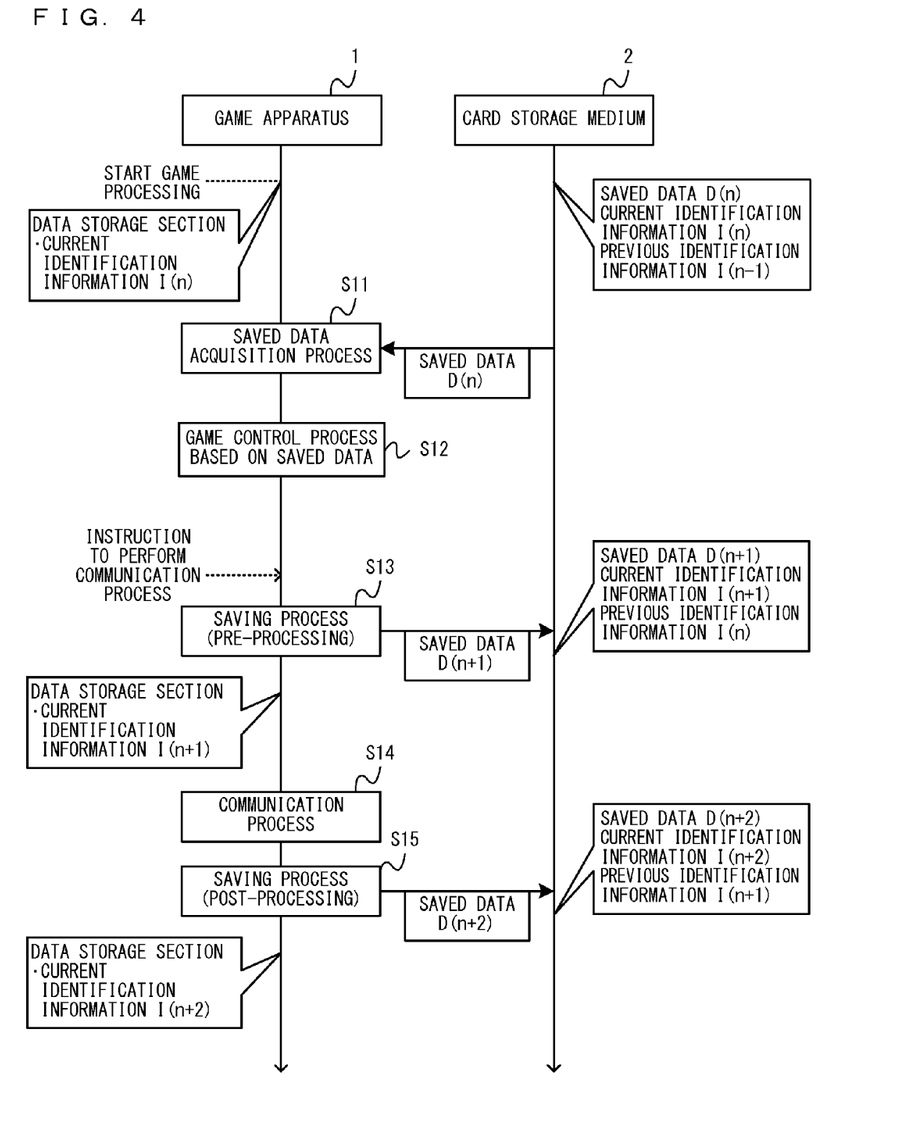
FIG. 4 is a diagram showing an example of the flow of the operation performed in game processing according to the exemplary embodiment.

FIG. 4 is a diagram showing an example of the flow of the operation performed in the game processing according to the exemplary embodiment. In FIG. 4, it is assumed that at the start of the game processing, data (information) similar to that in the case shown in FIG. 2 is stored in the card storage medium 2, and data (information) similar to that in the case shown in FIG. 2 is stored in the data storage section 15.

At predetermined timing after the start of the game processing, the game apparatus 1 performs the saved data acquisition process described above (step S11). In the example shown in FIG. 4, the saved data D(n) is acquired in the saved data acquisition process, and the game control process based on the saved data D(n) is performed (step S12). It should be noted that the saved data acquisition process is performed, for example, at the start of the game in order to perform the rest of the game after the point where the data has previously been saved.

In the exemplary embodiment, while the game control process is being performed based on the saved data D(n), the communication process is performed. The content of the communication process may be any content. In the exemplary embodiment, the communication process is the process of exchanging an item or a character that appears in the game, between the game apparatus 1 and the other game apparatus. The saved data includes information that changes by the communication process, that is, information representing the item or the character. The communication process is started in accordance with, for example, the fact that the user has given an instruction to start the communication process (a communication start instruction) in the state where the game apparatus 1 and the other game apparatus can communicate with each other. It should be noted that the condition under which the communication process is performed and the timing at which the communication process is performed may be any condition and any timing, respectively.

If the above instruction has been given, the game apparatus 1 performs the saving process before starting the communication process (step S13). Hereinafter, the saving process performed before the communication process is referred to as a "pre-processing saving process". The specific processing content of the pre-processing saving process is similar to that of the saving process shown in FIG. 2. In the example shown in FIG. 4, by the pre-processing saving process, the saved data D(n+1), the current identification information I(n+1), and the previous identification information I(n) are stored in the card storage medium 2. Further, by the pre-processing saving process, the current identification information I(n+1) is stored in the data storage section 15.

The pre-processing saving process is a process automatically performed in accordance with the communication start instruction. It should be noted that the phrase "automatically performed" means "performed without an instruction from the user other than the communication start instruction".

After the pre-processing saving process has been completed, the game apparatus 1 performs the communication process (step S14). By the communication process, the game situation in the game apparatus 1 changes (for example, the numbers of items and characters that appear increase or decrease). As a result, the content of the saved data varies before and after the communication process. That is, the communication process can be said to be the process of changing the content to be saved as saved data.

In the exemplary embodiment, the communication process is performed under the condition that the pre-processing saving process has been completed. That is, for example, if the pre-processing saving process has not normally been performed and has been halted, the game apparatus 1 does not perform the communication process. It should be noted that if the user has given the communication start instruction anew after that, the pre-processing saving process is performed again. If the pre-processing saving process performed again has (normally) been completed, the communication process is performed.

If the communication process has been completed, the game apparatus 1 performs the saving process again (step S15). Hereinafter, the saving process performed after (immediately after) the communication process is referred to as a "post-processing saving process". The specific processing content of the post-processing saving process is similar to that of the saving process shown in FIG. 2. In the example shown in FIG. 4, by the post-processing saving process, saved data D(n+2), current identification information I(n+2), and previous identification information I(n+1) are stored in the card storage medium 2. Further, by the pre-processing saving process, the current identification information I(n+2) is stored in the data storage section 15.

Figure 5:
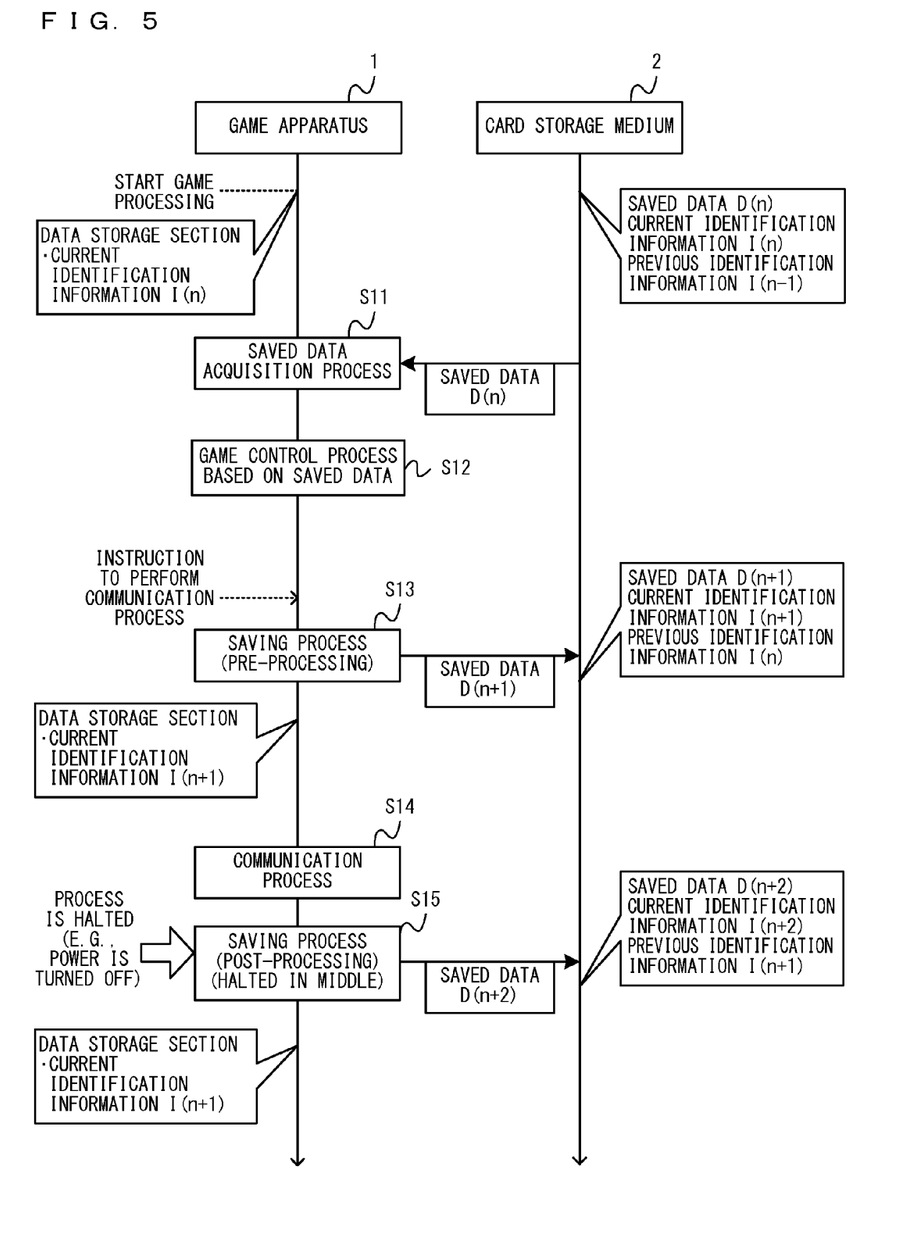
FIG. 5 is a diagram showing an example of the flow of the operation performed in the game processing in the case where a post-processing saving process is not normally performed.
Figure 6:
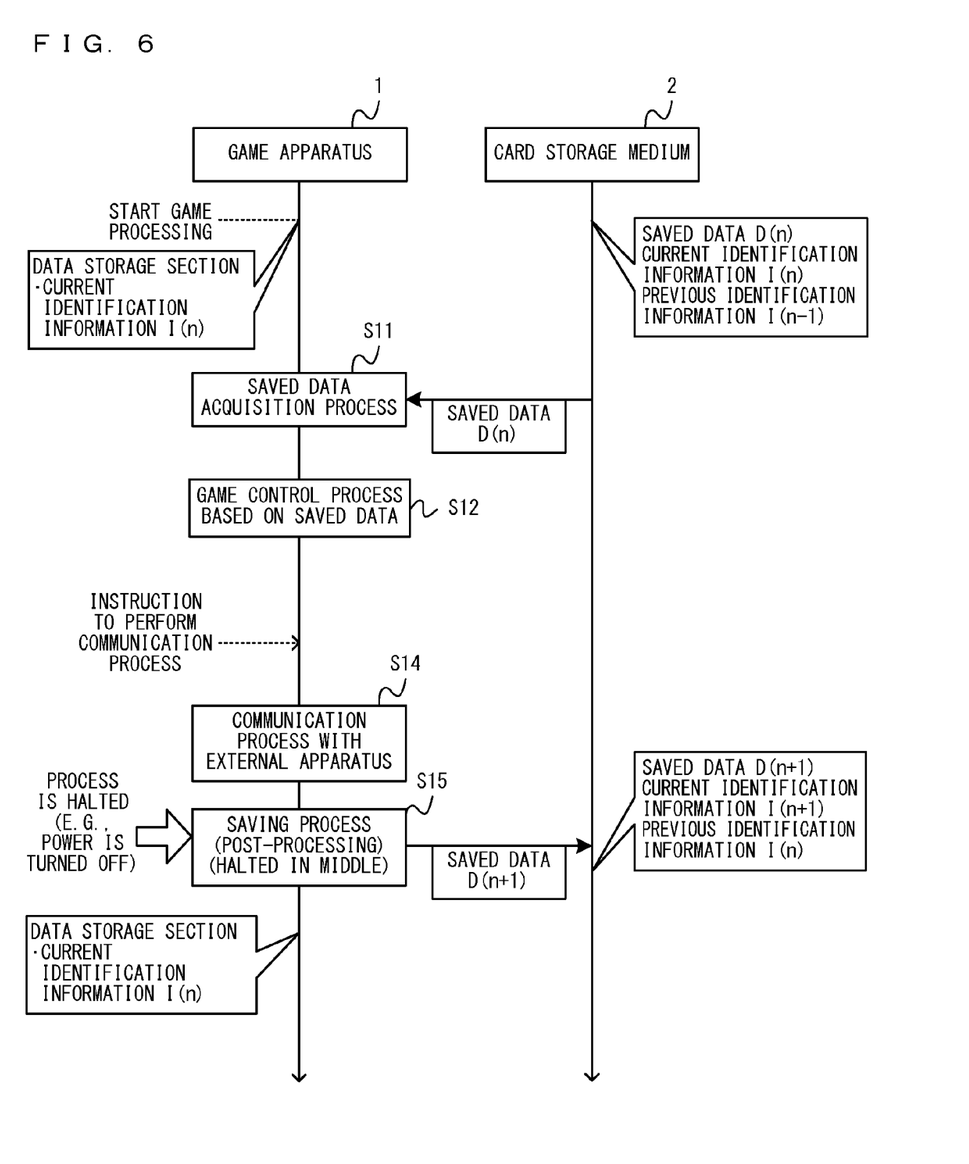
FIG. 6 is a diagram showing an example of the flow of the operation performed in the game processing in the case where it is assumed that the pre-processing saving process is not performed.

As described above, in the exemplary embodiment, if the communication process is performed, two saving processes, namely the pre-processing saving process and the post-processing saving process, are performed. In the exemplary embodiment, the two saving processes are performed before and after the communication process, thereby reducing the possibility of the abuse of saved data before the communication process. With reference to FIGS. 5 and 6, the reason for this is described.

FIG. 5 is a diagram showing an example of the flow of the operation performed in the game processing in the case where the post-processing saving process is not normally performed. It should be noted that in FIG. 5, the processes until the completion of the communication process (the processes of steps S11 to S14) are the same as those in FIG. 4 and therefore are not described here.

FIG. 5 shows the case where, after the process of writing data to the card storage medium 2 has been completed in the middle of the post-processing saving process, the post-processing saving process has been halted for some reason. In this case, as shown in FIG. 5, the content of the current identification information is different between the card storage medium 2 and the data storage section 15. That is, the card storage medium 2 stores the current identification information I(n+2), whereas the data storage section 15 stores the current identification information I(n+1).

Here, the case is considered where it is assumed that the pre-processing saving process is not performed. FIG. 6 is a diagram showing an example of the flow of the operation performed in the game processing in the case where it is assumed that the pre-processing saving process is not performed. FIG. 6 shows the case where the pre-processing saving process is not performed, and the case where the post-processing saving process is not normally performed as in the case shown in FIG. 5. In this case, the data storage section 15 stores the current identification information I(n). This enables the use of the content stored in the card storage medium 2 at the start of the game processing (the saved data D(n) corresponding to the current identification information I(n)). The content of the card storage medium 2 at the start of the game processing can be relatively easily copied by, for example, removing the card storage medium 2 from the game apparatus 1 before the start of the game processing and connecting the card storage medium 2 to another information processing apparatus. Thus, if the saved data D(n) at the start of the game processing becomes able to be used, dishonesty in the game may be committed.

In response, in the exemplary embodiment, the pre-processing saving process is performed. Thus, if the post-processing saving process has been halted, the data storage section 15 stores the current identification information I(n+1) (see FIG. 5). Thus, it is impossible to use the content of the card storage medium 2 at the start of the game processing (the saved data D(n) corresponding to the current identification information I(n)). As described above, according to the exemplary embodiment, if the communication process is performed, two saving processes are performed. This can make it impossible to use saved data before the communication process (the saved data at the start of the game processing).

It should be noted that in the exemplary embodiment, if the post-processing saving process has been halted, it is possible to use the content stored in the card storage medium 2 by the pre-processing saving process (the saved data D(n+1) corresponding to the current identification information I(n+1)). In the exemplary embodiment, however, the pre-processing saving process, the communication process, and the post-processing saving process are successively performed. Thus, it is difficult to read and copy the content stored in the card storage medium 2 by the pre-processing saving process (separately from the game apparatus 1). Thus, in the exemplary embodiment, if the communication process is performed, two saving processes are performed.

This makes it possible to reduce the possibility of the abuse of saved data before the communication process.

It should be noted that if the card storage medium 2 has been removed from the game apparatus 1 during the communication process, or if access has been made to the card storage medium 2 during the communication process, the game apparatus 1 may halt the communication process. Based on this, it is more difficult (or impossible) to copy the content stored in the card storage medium 2 by the pre-processing saving process. This makes it possible to further reduce the possibility of the abuse of saved data.

As described above, in the exemplary embodiment, predetermined information processing (the communication process) is performed while the game program is being executed (step S14). If the communication process is performed, the game apparatus 1 updates the saved data before the communication process is performed (step S13), and also updates the saved data after the communication process is performed (step S15). This makes it possible to reduce the possibility of the abuse of saved data before the communication process.

It should be noted that in the exemplary embodiment, the game apparatus 1 performs the pre-processing saving process immediately before the communication process is performed (and after the communication start instruction is given). The timing at which the pre-processing saving process is performed is not limited to this. If the pre-processing saving process is performed in a period before the communication process and in a period in which it is impossible to read the saved data stored in the card storage medium 2, it is possible to obtain an effect similar to the above. The above "period in which it is impossible to read the saved data" is, for example, a period in which it is prohibited to remove the card storage medium 2 from the game apparatus 1 (if the card storage medium 2 has been removed, the game processing is halted), or a period in which it is prohibited to access the card storage medium 2 (the saved data). For example, while the game program is being executed, if it is prohibited to remove the card storage medium 2 from the game apparatus 1 or it is prohibited to access the card storage medium 2, the period while the game program is being executed is the above "period in which it is impossible to read the saved data".

Further, in the exemplary embodiment, if the user has given an instruction to perform the communication process, the communication process is performed under the condition that the update of the saved data and the identification information before the communication process is performed (the pre-processing saving process) has been completed. Based on this, the communication process is not performed in the case where the saved data before the start of the pre-processing saving process remains in the card storage medium 2. This makes it possible to further reduce the possibility of the abuse of saved data before the start of the pre-processing saving process.

Further, in the exemplary embodiment, as an example of the predetermined information processing performed between the pre-processing saving process and the post-processing saving process, the communication process is performed. In the communication process, the process is performed of exchanging objects (items and/or characters) that appear in the game. For example, as the process of delivering an object, the process is performed of deleting an object in the game performed by the game apparatus 1 and adding the object to the game performed by another game apparatus. Here, in such a communication process, if it is possible to abuse saved data before the communication process by copying it, for example, it is possible to leave also in the game apparatus 1 an item delivered to another game apparatus (deleted from the game apparatus 1) by the communication process. That is, it is possible to copy the item and therefore commit dishonesty in the game. In response, in the exemplary embodiment, as described above, it is possible to reduce the possibility the abuse of saved data before the communication process. This makes it possible to prevent dishonesty in the game using the communication process with more certainty.

It should be noted that the communication process is not limited to the process of exchanging objects that appear in the game, but may be any process of changing the content of information saved as saved data. If the content of saved data is changed by the communication process, it may be possible to commit dishonesty in the game using saved data before the communication process. In such a case, however, the use of the method of storing saved data according to the exemplary embodiment makes it possible to reduce dishonesty in the game.

(2-5: Identification Information)

As described above, in the exemplary embodiment, if saved data is updated, the game apparatus 1 generates identification information indicating the updated saved data based on a random number. That is, information indicating a random value that is random for each piece of saved data is used as identification information. The identification information according to the exemplary embodiment can be said to be information that cannot be estimated from saved data. If such identification information is used, it is difficult (or impossible) to estimate the current identification information stored in the game apparatus 1. Thus, it is difficult to falsify the identification information so that the content stored in the past in the card storage medium 2 can be used again. That is, based on the above, it is possible to prevent the abuse of saved data with more certainty. It should be noted that identification information generated based on a random number is not limited to the above random value. For example, in another exemplary embodiment, the identification information corresponding to saved data that is generated first may be a random value, and the identification information corresponding to saved data that is generated after that may be a value obtained by adding a predetermined number to the random value. This also makes it possible to prevent the abuse of saved data with more certainty, similarly to the above.

It should be noted that identification information may be any information that allows the identification (distinction) of saved data. For example, in another exemplary embodiment, if saved data is updated, identification information indicating the updated saved data may be generated based on the updated saved data. For example, the game apparatus 1 may use, as identification information, information used as a checksum for saved data or information about a hash value generated from saved data. Based on the above, it is easy to generate identification information from saved data. It should be noted that if identification information is generated from saved data, the game apparatus 1 may generate identification information using a method (algorithm) of making it difficult to estimate the value of the identification information from the saved data.

Further, in the exemplary embodiment, the (current) identification information stored in the card storage medium 2 as the identification information corresponding to certain saved data and the (current) identification information stored in the data storage section 15 as the identification information corresponding to the certain saved data have the same value.

Here, in another exemplary embodiment, the identification information indicating certain saved data and stored in the card storage medium 2 and the identification information indicating the certain saved data and stored in the data storage section 15 may have different values. For example, the game apparatus 1 may set the above random value as the current identification information stored in the card storage medium 2 and set a value obtained by subtracting the random value from a predetermined value determined in advance, as the current identification information stored in the data storage section 15. In this case, in the determination process in the above step S5, based on whether or not the two pieces of current identification information indicate the predetermined value, it is possible to determine whether or not the identification information indicating the same saved data is stored in the card storage medium 2 and the data storage section 15, that is, whether or not it is possible to use the saved data.

[3. Specific Example of Game Processing]

Figure 7:
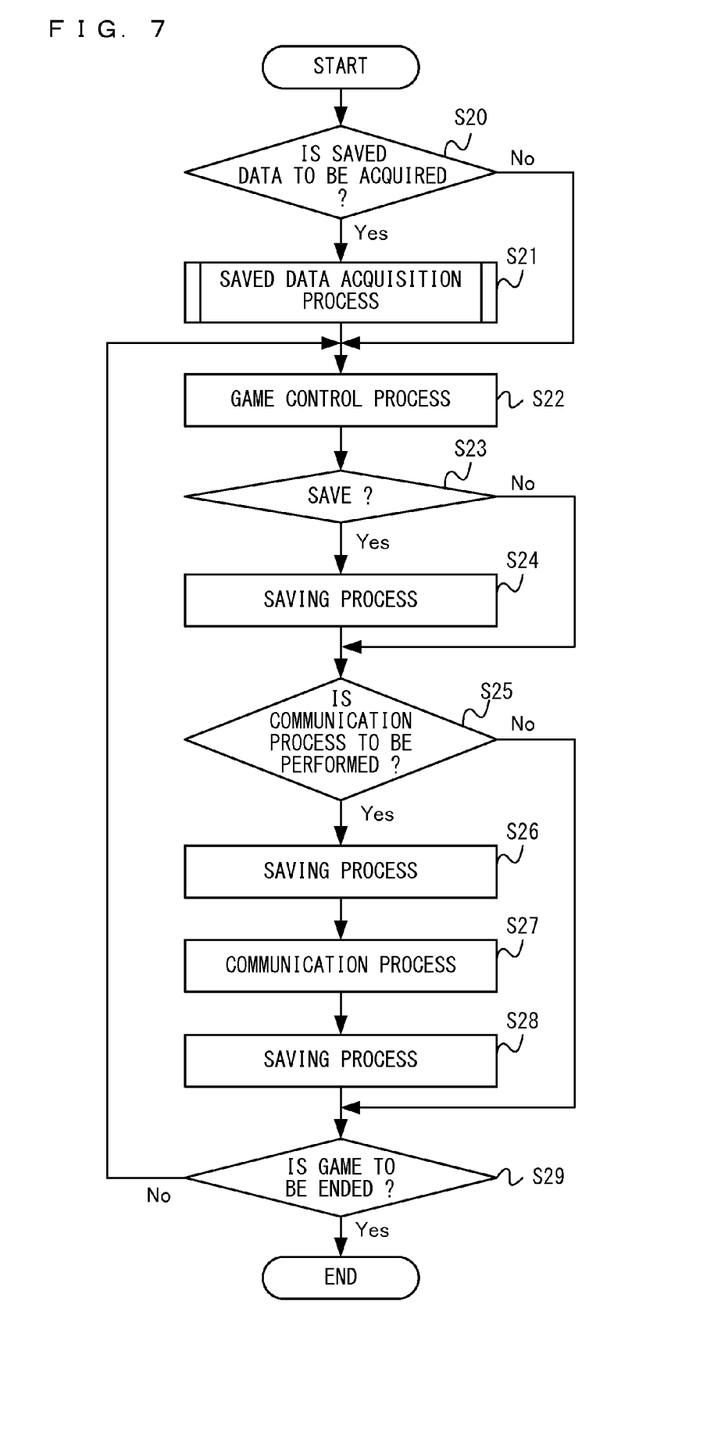
FIG. 7 is a flow chart showing an example of the flow of the game processing performed by a game apparatus according to the exemplary embodiment.

A description is given below of a specific example of the game processing performed by the information processing system (the game apparatus 1) according to the exemplary embodiment. FIG. 7 is a flow chart showing an example of the flow of the game processing performed by the game apparatus 1 (the CPU of the control section 11) according to the exemplary embodiment. In the exemplary embodiment, a series of processes shown in FIG. 7 is performed by the CPU of the control section 11 executing the game program stored in the program storage section 12.

The game processing shown in FIG. 7 is started at any timing. In the exemplary embodiment, for example, in accordance with the fact that the user has given an instruction to start the execution of the game program, the game processing is started. Further, a part or all of the game program is loaded into the memory of the control section 11 at appropriately timing and executed by the CPU. Consequently, the series of processes shown in FIG. 7 is started. It should be noted that the game program is stored in advance in the program storage section 12 included in the game apparatus 1. Alternatively, in another exemplary embodiment, the game program may be acquired from a storage medium attachable to and detachable from the game apparatus 1 and stored in the memory, or may be acquired from another apparatus via a network such as the Internet and stored in the memory.

Figure 8:
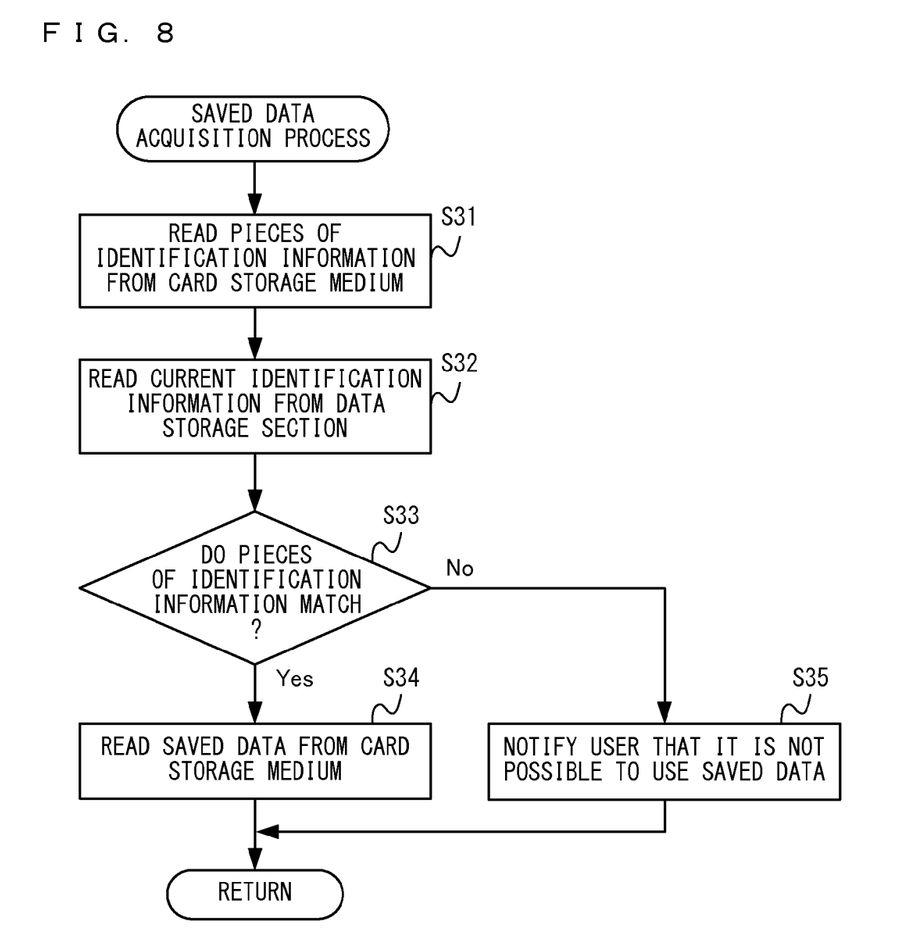
FIG. 8 is a flow chart showing an example of a detailed flow of a saved data acquisition process (step S21) shown in FIG. 7.

It should be noted that the processes of all the steps in the flow charts shown in FIGS. 7 and 8 are merely illustrative. Thus, the processing order of the steps may be changed, or another process may be performed in addition to (or instead of) the processes of all the steps, so long as similar results are obtained. Further, in the exemplary embodiment, descriptions are given on the assumption that the CPU performs the processes of all the steps in the flow chart. Alternatively, a processor or a dedicated circuit other than the CPU may perform the processes of some of the steps in the flow chart.

In the game processing, first, in step S20, the CPU determines whether or not saved data is to be acquired from the card storage medium 2. This determination is made based on, for example, whether or not the user has given an instruction to play the rest of the game that has previously been saved. If the result of the determination in step S20 is affirmative, the process of step S21 is performed. If, on the other hand, the result of the determination in step S20 is negative, the process of step S21 is skipped, and the process of step S22 is performed.

In step S21, the CPU performs the saved data acquisition process described above (the above steps S4 to S6). With reference to FIG. 8, the details of the saved data acquisition process are described below.

FIG. 8 is a flow chart showing a detailed flow of the saved data acquisition process (step S21) shown in FIG. 7. In the saved data acquisition process, first, in step S31, the CPU reads the current identification information and the previous identification information from the card storage medium 2. In the subsequent step S32, the CPU reads the current identification information from the data storage section 15. The read pieces of identification information are stored in the memory.

In step S33, the CPU determines, using the pieces of identification information stored in the memory in the above steps S31 and S32, whether or not either of the two pieces of identification information read from the card storage medium 2 matches the current identification information read from the data storage section 15. If the result of the determination in step S33 is affirmative, the process of step S34 is performed. If, on the other hand, the result of the determination in step S33 is negative, the process of step S35 is performed.

In step S34, the CPU reads the saved data from the card storage medium 2 and stores the saved data in the memory. On the other hand, in step S35, the CPU notifies the user that it is not possible to use the saved data. For example, a message stating "the saved data cannot be used" is displayed on the display section 14. After the above step S34 or S35, the CPU ends the saved data acquisition process. After the saved data acquisition process, the process of step S22 is performed.

Referring back to FIG. 7, in step S22, the CPU performs the game control process for advancing the game in accordance with an operation performed by the user. At this time, if the saved data has been acquired in the above step S21, the game control process is performed based on the saved data stored in the memory. For example, the progression of the game may be started from the game situation indicated by the saved data, or the game may be started from the state of a player character indicated by the saved data. If, on the other hand, the saved data has not been acquired, the game control process is performed without using the saved data. For example, the game is started such that the game situation and the state of a player character are initial states.

In step S23, the CPU determines whether or not the saving process is to be performed. This determination is made based on whether or not the user has given an instruction to save the game state, and whether or not the game situation has entered a predetermined state where data is saved (for example, the state where the game has been completed, or the like). That is, if the user has given the above instruction, or if the game situation has entered the above predetermined state, the CPU determines that the saving process is to be performed. If the result of the determination in step S23 is affirmative, the process of step S24 is performed. If, on the other hand, the result of the determination in step S23 is negative, the process of step S24 is skipped, and the process of step S25 is performed.

In step S24, the CPU performs the saving process described in the above "2-1: Saving Process". After step S24, the process of step S25 is performed.

In step S25, the CPU determines whether or not the communication process is to be performed. That is, the CPU determines whether or not the user has given the communication start instruction described above in the state where the game apparatus 1 and another game apparatus can communicate with each other. If the result of the determination in step S25 is affirmative, the process of step S26 is performed. If, on the other hand, the result of the determination in step S25 is negative, the processes of steps S26 to S28 are skipped, and the process of step S29 is performed.

In step S26, the CPU performs the pre-processing saving process. The processing content of the pre-processing saving process is similar to that of the saving process in the above step S24. In the subsequent step S27, the CPU performs the communication process described in the above "2-4: Game Processing". Further, in the subsequent step S28, the CPU performs the post-processing saving process. The processing content of the post-processing saving process is similar to that of the saving process in the above step S24. After step S28, the process of step S29 is performed.

By the series of processes of the above steps S26 to S28, the series of processes of steps S13 to S15 shown in FIG. 4 is performed. It should be noted that although not shown in FIG. 7, if the saving process has not normally been performed (if the game apparatus 1 has been turned off, for example), the game processing per se shown in FIG. 7 stops (ends).

In step S29, the CPU determines whether or not the game is to be ended. This determination is made based on, for example, whether or not the user has given an instruction to end the game. If the result of the determination in step S29 is negative, the process of step S22 is performed again. Thereafter, the processes of steps S22 to S29 are repeated until it is determined in step S29 that the game is to be ended. If, on the other hand, the result of the determination in step S11 is affirmative, the CPU ends the game processing shown in FIG. 7.

It should be noted that in the example of the processing, a description has been given taking as an example the case where the saved data acquisition process can be performed only at the start of the game processing. Alternatively, in another exemplary embodiment, the saved data acquisition process may be performed at appropriate timing in the game processing (for example, at timing at which the user has given an instruction).

[4. Variations]

In the above exemplary embodiment, a description has been given taking a game program as an example of an application to be executed in the information processing system. The type of application which is executed in the information processing system and of which saved data is stored is any type.

The above exemplary embodiment can be used for, for example, a game system, a game apparatus, a game program, and the like in order, for example, to reduce the possibility of the use of saved data copied dishonestly.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing apparatus for storing saved data in an external storage medium, the information processing apparatus comprising one or more processors performing:
   storing, in the external storage medium, saved data and identification information indicating the updated saved data;
   storing, in an internal storage medium of the information processing apparatus, identification information indicating the updated saved data and identification information indicating the saved data before being updated; and
   allowing use of the saved data stored in the external storage medium, at least under the condition that the identification information indicating the same saved data is stored in both the external storage medium and the internal storage medium.

2. An information processing system including a first storage device for storing saved data of an application and a second storage device, the information processing system comprising one or more processors performing:
   every time saved data is updated, storing, in the first storage device and the second storage device, identification information indicating the updated saved data;
   every time saved data is updated, storing, in at least one of the first storage device and the second storage device, the identification information corresponding to the saved data before being updated; and
   allowing use of the saved data stored in the first storage device, at least under the condition that the identification information indicating the same saved data is stored in the first storage device and the second storage device.

3. The information processing system according to claim 2, wherein
   the one or more processors further perform:
      executing predetermined information processing during execution of the application; and
      if the predetermined information processing is executed, updating the saved data before the execution of the information processing, and updating the saved data after the execution of the predetermined information processing.

4. The information processing system according to claim 3, wherein
   if a user has given an instruction to execute the predetermined information processing, the predetermined information processing is executed under the condition that update of the saved data and the identification information before the execution of the predetermined information processing has been completed.

5. The information processing system according to claim 3, wherein
   the saved data includes information indicating an object that appears in the application, and
   the predetermined information processing is a process of performing communication between the information processing system and another information processing system, and is a process of deleting the object in the application executed in the information processing system, and adding the object to the application executed in the other information processing system.

6. The information processing system according to claim 2, wherein
   the one or more processors further perform, if the saved data is updated, generating the identification information indicating the updated saved data based on a random number.

7. The information processing system according to claim 2, wherein
   the one or more processors further perform, if the saved data is updated, generating the identification information indicating the updated saved data based on the updated saved data.

8. The information processing system according to claim 2, wherein
the identification information corresponding to the saved data before being updated is stored in either one of the first storage device and the second storage device, and if the saved data is updated, the identification information corresponding to the updated saved data is stored, between the first storage device and the second storage device, first in a storage device for storing the identification information corresponding to the saved data before being updated and later in the other storage device.

9. The information processing system according to claim 2, wherein
the information processing system includes an information processing apparatus for executing the application,
the first storage device is a storage medium attachable to and detachable from the information processing apparatus, and
the second storage device is a storage medium built into the information processing apparatus.

10. An information processing apparatus capable of accessing a first storage device for storing saved data of an application and a second storage device, the information processing apparatus comprising one or more processors performing:
every time saved data is updated, storing, in the first storage device and the second storage device, identification information indicating the updated saved data;
every time saved data is updated, storing, in at least one of the first storage device and the second storage device, the identification information corresponding to the saved data before being updated; and
allowing use of the saved data stored in the first storage device, at least under the condition that the identification information indicating the same saved data is stored in the first storage device and the second storage device.

11. A non-transitory computer-readable storage medium having stored therein an information processing program to be executed by a computer of an information processing apparatus capable of accessing a first storage device for storing saved data of an application and a second storage device, the information processing program causing the computer to execute:
every time saved data is updated, storing, in the first storage device and the second storage device, identification information indicating the updated saved data;
every time saved data is updated, storing, in at least one of the first storage device and the second storage device, the identification information corresponding to the saved data before being updated; and
allowing use of the saved data stored in the first storage device, at least under the condition that the identification information indicating the same saved data is stored in the first storage device and the second storage device.

12. A method of storing saved data, the method executed by an information processing system capable of accessing a first storage device for storing saved data of an application and a second storage device, the method comprising:
every time saved data is updated, storing, in the first storage device and the second storage device, identification information indicating the updated saved data;
every time saved data is updated, storing, in at least one of the first storage device and the second storage device, the identification information corresponding to the saved data before being updated; and
allowing use of the saved data stored in the first storage device, at least under the condition that the identification information indicating the same saved data is stored in the first storage device and the second storage device.

* * * * *